(12) United States Patent
Emmrich et al.

(10) Patent No.: US 11,625,676 B2
(45) Date of Patent: Apr. 11, 2023

(54) METHOD FOR OPERATING TRANSPORT SYSTEMS

(71) Applicant: Bayerische Motoren Werke Aktiengesellschaft, Munich (DE)

(72) Inventors: Kay Emmrich, Taucha (DE); Ruediger Julius, Naunhof (DE); Daniel Klukas, Halle (DE); Ronny Mehnert, Wiedemar (DE); Mirko Winkler, Leipzig (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 368 days.

(21) Appl. No.: 16/664,254

(22) Filed: Oct. 25, 2019

(65) Prior Publication Data
US 2020/0065749 A1    Feb. 27, 2020

Related U.S. Application Data

(63) Continuation of application No. PCT/EP2018/057117, filed on Mar. 21, 2018.

(30) Foreign Application Priority Data

Apr. 28, 2017   (DE) ..................... 10 2017 207 167.2

(51) Int. Cl.
*G06Q 10/08*    (2012.01)
*G05D 1/02*     (2020.01)
(Continued)

(52) U.S. Cl.
CPC ......... *G06Q 10/087* (2013.01); *G05D 1/0088* (2013.01); *G05D 1/0212* (2013.01); *G06Q 10/0833* (2013.01); *G05D 2201/0216* (2013.01)

(58) Field of Classification Search
CPC .. G06Q 10/087; G06Q 10/0833; G06Q 10/08; G05D 1/0088; G05D 1/0212; G05D 2201/0216
See application file for complete search history.

(56) References Cited

U.S. PATENT DOCUMENTS

| 2008/0051984 A1 | 2/2008 | Wurman et al. |
| 2010/0045484 A1 | 2/2010 | Brynielsson |
| 2012/0004766 A1 | 1/2012 | Stoll et al. |

(Continued)

FOREIGN PATENT DOCUMENTS

| DE | 33 37 392 A1 | 4/1985 |
| DE | 10 2008 059 529 A1 | 6/2010 |

(Continued)

OTHER PUBLICATIONS

International Search Report (PCT/ISA/210) issued in PCT Application No. PCT/EP2018/057117 dated May 3, 2018 with English translation (four (4) pages).

(Continued)

*Primary Examiner* — Paul Danneman
(74) *Attorney, Agent, or Firm* — Crowell & Moring LLP

(57) ABSTRACT

A method operates different transport systems in a logistics area, wherein the logistics area is divided into a plurality of zones. The method receives a first reservation request to reserve one or more zones of the logistics area for a first transport system. The method determines an occupation status of the one or more zones. The method reserves the one or more zones for the first transport system depending on the occupation status of the one or more zones.

9 Claims, 3 Drawing Sheets

(51) Int. Cl.
  *G06Q 10/087* (2023.01)
  *G05D 1/00* (2006.01)
  *G06Q 10/0833* (2023.01)

(56) References Cited

U.S. PATENT DOCUMENTS

| | | | | |
|---|---|---|---|---|
| 2013/0304253 | A1* | 11/2013 | Wurman | G05D 3/00 700/214 |
| 2014/0365258 | A1* | 12/2014 | Vestal | G05D 1/0274 901/1 |
| 2017/0308096 | A1* | 10/2017 | Nusser | G05D 1/0287 |
| 2020/0364653 | A1* | 11/2020 | Rongley | B65D 88/74 |

FOREIGN PATENT DOCUMENTS

| | | |
|---|---|---|
| SE | 0700754 L | 9/2008 |
| WO | WO 2007/149703 A2 | 12/2007 |

OTHER PUBLICATIONS

German-language Written Opinion (PCT/ISA/237) issued in PCT Application No. PCT/EP2018/057117 dated May 3, 2018 (six (6) pages).

German-language Search Report issued in counterpart German Application No. 10 2017 207 167.2 dated Mar. 13, 2018 with partial English translation (15 pages).

"Fahrerloses Transportfahrzeug", Wikipedia, Feb. 20, 2017, https://de.wikipedia.org/w/indexphp?title=Fahredoses_Transoortfahrzeug&oldid=162835360#FTS-Leitsteuerung (22 pages).

Cover page of EP 2 047 376 AO published Apr. 15, 2009 (one (1) page).

English translation of Chinese Office Action issued in Chinese Application No. 201880010559.9 dated Sep. 2, 2022 (nine (9) pages).

* cited by examiner

METHOD FOR OPERATING TRANSPORT SYSTEMS

CROSS REFERENCE TO RELATED APPLICATIONS

This application is a continuation of PCT International Application No. PCT/EP2018/057117, filed Mar. 21, 2018, which claims priority under 35 U.S.C. § 119 from German Patent Application No. 10 2017 207 167.2, filed Apr. 28, 2017, the entire disclosures of which are herein expressly incorporated by reference.

BACKGROUND AND SUMMARY OF THE INVENTION

The invention relates to a method and a corresponding control unit for operating different transport systems in a logistics area.

Today, in a logistics area, for example in a warehouse and/or in a product manufacturing process, automatic transport systems are used in order to convey goods to various points within the logistics area. Thereby, an automatic transport system can include a guidance system, which guides transport vehicles of the transport system through the logistics area.

A plurality of different automatic transport systems can be used in a logistics area. Examples of different transport systems include an automatic route train, a driverless transport system (DTS), a forklift, etc. The different transport systems typically share one or a plurality of common routes in the logistics area. For this reason, conflicts can result when operating different transport systems in a logistics area.

The present document deals with the technical task of providing a method and a control unit, by which different transport systems can be operated in a logistics area in a reliable and flexible way.

According to one aspect of the invention, a method for operating different transport systems in a logistics area is described. The different transport systems can comprise different guidance systems, by which one or a plurality of transport vehicles of the respective transport system can be guided through the logistics area. The different guidance systems can be independent of one another so that no direct communication and/or coordination between the guidance systems of the different transport systems is/are made possible. The different transport systems can, for example, comprise an automatic route train, a driverless transport system (DTS), one or a plurality of forklifts, etc.

In particular, a transport system may be an automatic transport system that typically has a dedicated guidance system with which one or a plurality of transport vehicles of the transport system can be guided through the logistics area. As an alternative, a transport system can be a manual transport system (e.g. a forklift, etc.). The manual transport system can have a connection to a suitable tracking system in order to determine position data with regard to the position of a manual transport vehicle within the logistics area.

A transport vehicle and/or a transport system can be at least partly autonomous. In particular, a transport vehicle can be set up not to drive off any specified route but, depending on the traffic situation in a logistics area, to determine and/or select the quickest, shortest and/or most economically sensible route. Furthermore, a transport vehicle can be designed to autonomously avoid an obstacle and/or to drive on a non-specified route. The zone concept described in this document makes it possible to operate different types of transport vehicles, in particular, with different autonomization grades, (e.g. an autonomous, a manual and/or an automatic transport vehicle), in a logistics area.

The logistics area is divided into a multitude of zones. In particular, the logistics area can comprise transport areas and loading/unloading areas, wherein the transport vehicles of the different transport systems can move within the transport areas and loading/unloading areas in order to move goods within the logistics area. The transport areas and loading/unloading areas can (if applicable, respectively) be divided into a plurality of zones. Thereby, the route of a transport vehicle within the logistics area can comprise a multitude of zones, which are gradually traveled through by the transport vehicle. For example, a zone can cover an area of 5 m$^2$, 1 m$^2$ or less of the logistics area.

The logistics area can, for example, be a warehouse or an assembly line for a product (e.g. for a road motor vehicle). The method can be performed by a control unit of the logistics area.

The method comprises receiving a first reservation request for reserving one or a plurality of zones of the logistics area for a first transport system. Furthermore, the method comprises determining an occupancy status of one or a plurality of zones. The occupancy status of a zone can, for example, show if the zone is already reserved for a transport system or not. Thereby, a zone can typically be reserved for a maximum of one transport system.

Furthermore, the method comprises reserving the one or a plurality of zones for the first transport system depending on the occupancy status of the one or a plurality of zones. Thereby, the one or a plurality of zones can, if applicable, only then be reserved for the first transport system if the occupancy status of the one or a plurality of zones shows that the one or a plurality of zones is/are not reserved for a transport system.

By means of a zone management system that is superordinate to the individual guidance systems of the different transport systems, the traffic of the transport vehicles of the different transport systems can be coordinated in a reliable and flexible way. In particular, deadlock situations between different transport systems on commonly used routes can be reliably avoided.

A reservation request for a transport vehicle of a transport system can be made by the guidance system of the respective transport system. In addition or as an alternative, in particular, in the case of a manual transport vehicle, a reservation request can be manually generated for a zone (e.g. by pressing a button on the mobile terminal device).

A second reservation request for reserving the one or a plurality of zones (or at least a part of the one or a plurality of zones) for a second transport system can (if applicable, substantially simultaneously) be received. A priority of the first transport system can then be determined relative to the second transport system. A first transport vehicle of the first transport system and a second transport vehicle of the second transport system can respectively transport goods within the logistics area. The priority can, for example, depend on the urgency of the goods to be transported. The one or a plurality of zones can then also be reserved for the first transport system depending on the priority. In this way, the transport of goods within the logistics area can be further improved.

The method can comprise receiving a release message from one of the transport systems for at least one zone of the logistics area. Then, in response to receiving the release message, the occupancy status of the at least one zone can be changed. In this way, the occupancy status of the different zones of the logistics area can be kept up to date in a reliable way. In particular, double occupancy or a blockage of zones within the logistics area can be avoided in this way.

Furthermore, the method can comprise determining, based upon the occupancy status, that the one or a plurality of zones are at least partially reserved for another transport system. The one or a plurality of zones can, in this case, only then be reserved for the first transport system if the occupancy status of the one or a plurality of zones shows that the one or a plurality of zones is/are not reserved for another transport system. In this way, double occupancy of zones can be avoided in a reliable manner.

The method can comprise sending out a response in relation to the reservation request (e.g. to the first transport system). Thereby, the response can show if the one or a plurality of zones is/are reserved for the first transport system or not.

According to another aspect, a control unit (e.g. as part of a traffic control system) for a logistics area is described, which is set up to carry out the method described herein for operating different transport systems in a logistics area.

According to another aspect, a method for operating a first transport system in a logistics area is described. The method can be carried out by the guidance system of the first transport system and/or by a transport vehicle of the first transport system.

The method comprises determining that a transport vehicle of the first transport system is driven into one or a plurality of zones of the logistics area on a route located ahead. For example, this can be determined on the basis of position data with regard to a position of the transport vehicle within the logistics area. The position data can, for example, be determined on the basis of one or a plurality of sensors (e.g. a GPS receiver and/or an image sensor) of the transport vehicle.

Furthermore, the method comprises sending a reservation request for the one or a plurality of zones to a control unit for the logistics area. The method furthermore comprises receiving a response regarding the reservation request. Furthermore, the method comprises having the transport vehicle drive into the one or a plurality of zones depending on the response. In particular, the transport vehicle can drive into the one or a plurality of zones if the response shows that the one or a plurality of zones has/have been reserved for the first transport system. On the other hand, an entry into the one or a plurality of zones can at least be prevented for the time being.

The method can furthermore comprise determining that the transport vehicle has left or will leave the one or a plurality of zones. A release message regarding the one or a plurality of zones can then be sent to the control unit. In this way, the one or a plurality of zones can be made available for another transport system.

According to another aspect, a control module for a transport system or for a transport vehicle of a transport system is described, wherein the control module is set up to carry out the method described in this document for operating a first transport system in a logistics area.

According to another aspect, a software (SW) program is described. The SW program can be set up to be run on a processor and to carry out one of the methods described in this document on account thereof.

According to another aspect, a storage medium is described. The storage medium can comprise an SW program, which is set up to be run on a processor and to carry out one of the methods described in this document on account thereof.

It should be noted that the methods, apparatuses and systems described in this document can be used both alone as well as in combination with other methods, apparatuses and systems described in this document. Furthermore, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
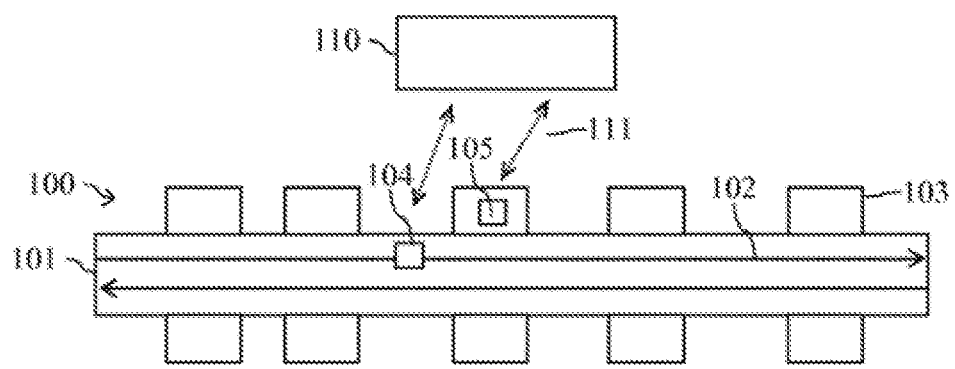
FIG. 1 is a diagram of an exemplary logistics area.

As explained at the beginning, the present document deals with the reliable and flexible operation of different transport systems in a logistics area. In this context, FIG. 1 shows an exemplary logistics area 100. The logistics area 100 comprises a plurality of loading/unloading areas 103, which are connected to each other via transport areas 101 and via routes 102.

Different transport systems may be operated in the logistics area 100. The transport systems may thereby not have any possibilities to directly communicate with each other. For example, transport systems of different manufacturers may have been provided and/or rely upon different guidance systems.

A transport vehicle 104, 105 of a transport system can pick up a good in a first loading/unloading areas 103 and then transport it to a second loading/unloading area 103 via a route 102. Thereby, during operation of the transport vehicles 104, 105 of a plurality of transport systems, conflict situations, in particular, on a route 102, can arise. For example, it may occur that two transport vehicles 104, 105 of different transport systems want to drive into a certain area 103, 101, 102 of the logistics area 100 at the same time. In the case of such a conflict situation, a deadlock typically results, which must be cleared up manually by an operator of the logistics area 100 most of the time.

Figure 2A:
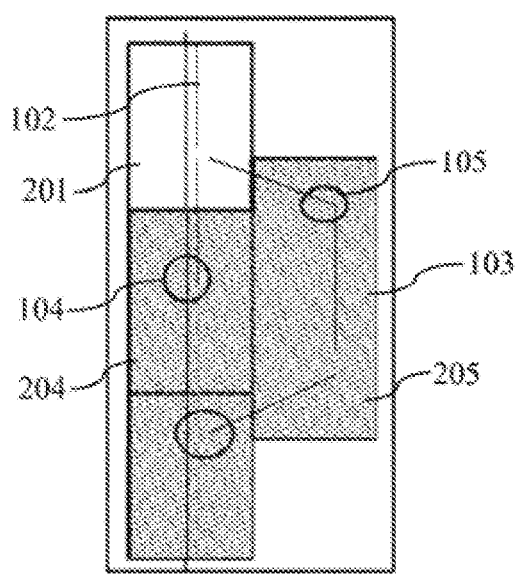
FIGS. 2A and 2B show exemplary zones for automatic transport systems.
Figure 2B:
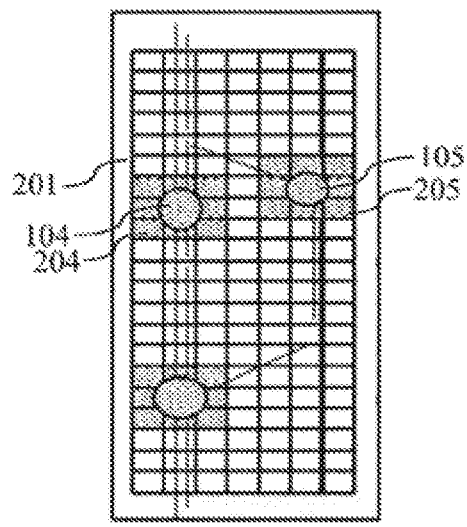

The transport systems operated within a logistics area 100 can communicate with a central control unit 110 via a (typically wireless) communication connection 111. The logistics area 100 can be divided into a multitude of zones. Thereby, as is shown in FIG. 2A, a relatively rough division into zones 201 or, as is shown in FIG. 2B, a relatively refined division into zones 201 can take place.

The control unit 110 can be set up to reserve one or a plurality of zones 201 of the logistics area 100 for a certain transport system. A transport vehicle 104, 105 of the certain transport system can then freely move within the one or a plurality of zones 201 reserved for the transport system. For example, as is shown in FIG. 2A, a first transport system reserves a first zone 204 and a second transport system reserves a second zone 205. A first transport vehicle 104 of the first transport system can then move freely within the first zone 204 and a second transport vehicle 105 of the second transport system can then move freely within the second zone 205. In addition or as an alternative, as is shown in FIG. 2B, the first transport system can reserve a plurality of first zones 204 and the second transport system can reserve a plurality of second zones 205.

Due to the fact that a zone 201, 204, 205 can only be reserved for a maximum of one transport system, deadlock situations can be reliably avoided. If the transport vehicles 104, 105 of two different transport systems want to drive into a certain area or into one or a plurality of certain zones 201, in this way, the transport systems can make a reservation request to the control unit 110 for the one or a plurality of zones 201. Following this, the control unit 110 can reserve the one or a plurality of zones 201 for exactly one of the two transport systems. Thereby, for example, a prioritization of the transport systems can take place according to urgency of the good to be respectively transported.

A transport vehicle 104 of the transport system, for which the one or a plurality of zones 201 has/have been reserved, can then drive into the one or a plurality of reserved zones 201. After driving through the one or a plurality of reserved zones 201, these can then be released again by means of a release message to the control unit 110. The control unit 110 can then reserve the one or a plurality of released zones 201 for the next transport system. In this way, a plurality of different transport systems can be operated in a logistics area 100 in a reliable manner.

Therefore, the map material for the possible routes of the different transport systems within a logistics area 100 can be divided into a multitude of zones 201. Each zone 201 can only be driven on by a transport vehicle 104, 105. The communication between the different transport systems and a central zone management system 110, (which, for example, is integrated within a guidance system of a transport system), can take place over a standardized communication interface 111.

For each transport vehicle 104, 105, one or a plurality of zones 204, 205 are reserved for transit. After transit, a transport vehicle 104, 105 releases again the one or a plurality of zones 104, 105 for occupancy.

A transport vehicle 104, 105 can comprise localization equipment or rely on localization equipment, which makes it possible to determine the position of a transport vehicle 104, 105 within the logistics area 100. In particular, position data can be determined for a transport vehicle 104, 105, which show which one or a plurality of zones 201, 204, 205 are occupied at a certain point in time by the transport vehicle 104, 105 and which one or a plurality of zones 201 should be reserved on the route located ahead for the transport vehicle 104, 105. In this way, zones 201 for a transport vehicle 104, 105 can be gradually reserved and released again along a route.

Figure 3A:
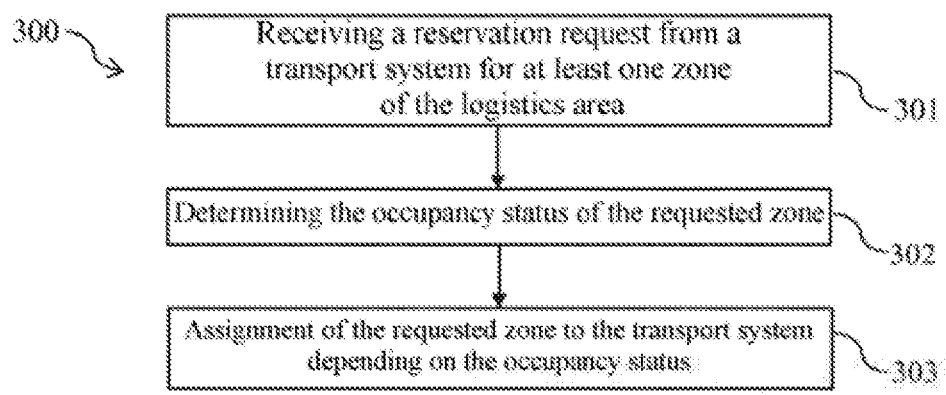
FIG. 3A is a flow chart of an exemplary method for operating transport systems in a logistics area.

FIG. 3A shows a flow chart of an exemplary method 300 for operating a plurality of transport systems with a plurality of transport vehicles 104, 105 in a logistics area 100. The method 300 can be carried out by a control unit 110, in particular by a zone management system, of the logistics area 100. The logistics area 100 is divided into a multitude of zones 201. In particular, the loading/unloading areas 103 and the transport areas 101 of the logistics area 100 are divided into different zones 201, wherein the different zones 201 can be reserved for the one or a plurality of transport vehicles 104, 105 of different transport systems.

The method 300 comprises receiving 301 a first reservation request for reserving one or a plurality of zones 201 of the logistics area 100 for a first transport system (in particular, for a first transport vehicle 104 of a first transport system). The reservation request can show that the first transport system would like to use the one or a plurality of zones 201 for the transport of goods within the logistics area 100. The first reservation request can be received via a (if applicable, wireless) communication connection 111.

Furthermore, the method 300 comprises determining 302 an occupancy status of the one or a plurality of zones 201. The control unit 110 can be set up to save the current occupancy status for each zone 201 of the logistics area. The occupancy status of a zone 201 can thereby show if the zone 201 is currently reserved for a transport system or not.

The method 300 furthermore comprises reserving 303 the one or a plurality of zones 201 for the first transport system depending on the occupancy status of the one or a plurality of zones 201. In particular, the one or a plurality of zones 201 can be reserved for the first transport system if it is determined that the one or a plurality of zones 201 has/have not already been reserved for another transport system. On the other hand, no reservations can typically take place as long as at least one or a plurality of requested zones 201 are still reserved for another transport system.

Figure 3B:
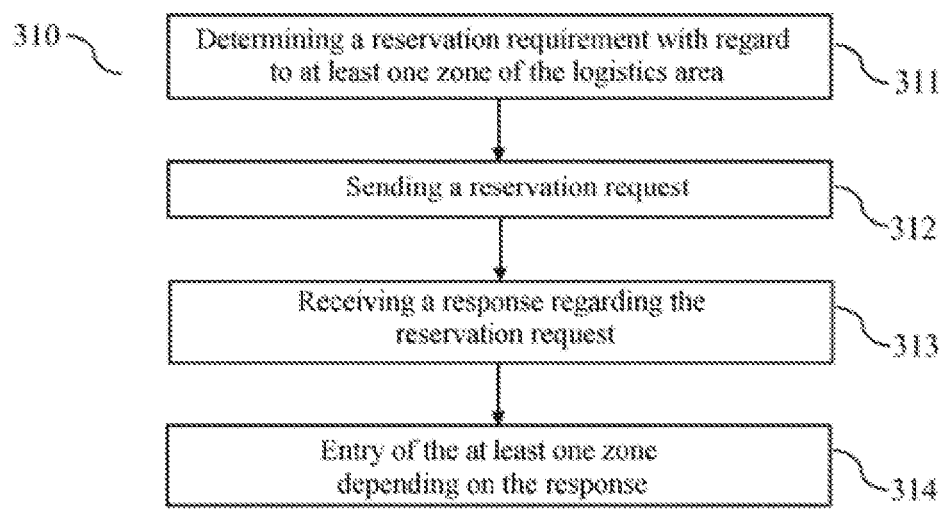
FIG. 3B is a flow chart of an exemplary method for operating a transport system.

FIG. 3B shows a method 310 for operating a first transport system in a logistics area 100. The method 310 can, for example, be carried out by a control module of the first transport system and/or of a transport vehicle 104 of the first transport system.

The method 310 comprises determining 311 that a transport vehicle 104 of the first transport system is driven into one or a plurality of zones 201 of the logistics area 100 on a first route located ahead. For example, this can be determined on the basis of position data with regard to a position of the transport vehicle 104 within the logistics area 100. Furthermore, the method 310 comprises sending 312 a reservation request for the one or a plurality of zones 201 to a control unit 110 for the logistics area 100.

Furthermore, the method 310 comprises receiving 313 a response regarding the reservation request. The method can, for example, show if the one or a plurality of zones 201 for the first transport system could be reserved or not. The response can be received via a (if applicable, wireless) communication connection 111.

The method 310 furthermore comprises, depending on the response, having 314 the transport vehicle 104 enter into the one or a plurality of zones 201. In particular, it can be instigated that the transport vehicle 104 of the first transport system drives into the one or a plurality of zones 201 if the response shows that the one or a plurality of zones 201 has/have been reserved for the first transport system. On the other hand, the transport vehicle 104 can be made to wait for a successful reservation of the one or a plurality of zones 201 or to change its route through the logistics area 100.

The assignment of zones 201 to different transport vehicles 104 by different transport systems can be part of a comprehensive traffic control system. In particular, the zone concept (with a multidimensional breakdown of a logistics area 100 into zones 201, with a reservation possibility and/or with a usage booking) described within this document as part of a comprehensive traffic control system can be combined with different sets of rules (right-of-way rules, sequential use, etc.), traffic flow logics (speed, direction, etc.), traffic areas (intersections, lanes, parking areas, etc.) and layout of the logistics area 100. The control unit 110 described in this document can be set up to provide the different components of the traffic control system.

The measures described in this document make it possible to operate different transport systems within a logistics area 100 in a reliable and flexible way. Thereby, in particular downtimes and/or deadlock situations between transport vehicles 104, 105 of the different transport systems can be avoided. Furthermore, other guidance systems and/or traffic control systems (e.g. traffic lights) can be done without.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating different transport systems in a logistics area, wherein each of the different transport systems has a different control system, wherein each of the different control systems is configured to guide a respective plurality of transport vehicles of the respective transport system through the logistics area, and wherein the logistics area is divided into a multitude of zones, the method comprising the acts of:
    receiving, by a control unit which is superordinate to the different control systems, a first reservation request for reserving one or a plurality of zones of the logistics area for a first transport system from a first control system of the first transport system, wherein the first transport system is a manual transport system, the first transport system includes a plurality of first transport vehicles, the first transport vehicles of the first transport system are manually driven vehicles, and the first control system is configured to guide the first transport vehicles of the first transport system through the logistics area;
    determining, by the control unit, an occupancy status of the one or the plurality of zones;
    receiving, by the control unit, a second reservation request for reserving the one or the plurality of zones for a second transport system from a second control system of the second transport system, wherein the second transport system includes a plurality of second transport vehicles and the second control system is configured to guide the second transport vehicles of the second transport system through the logistics area;
    determining, by the control unit, a priority of the first transport system relative to the second transport system; and
    reserving, by the control unit, the one or the plurality of zones for the first transport system depending on the occupancy status of the one or the plurality of zones and depending on the priority,
    wherein the transport vehicles of the different transport systems have different degrees of automation.

2. The method according to claim 1, wherein
    a first transport vehicle of the first transport system and a second transport vehicle of the second transport system respectively transport goods within the logistics area; and
    the priority depends on an urgency of the goods to be transported.

3. The method according to claim 1, further comprising the acts of:
    receiving a release message from one of the different transport systems for at least one zone of the logistics area; and
    in response thereto, changing the occupancy status of at least one zone.

4. The method according to claim 1, wherein
    the occupancy status of a zone indicates if the zone is reserved for a transport system or not; and
    the one or the plurality of zones is only then reserved for the first transport system if the occupancy status of the one or the plurality of zones indicates that the one or the plurality of zones is not reserved for a transport system.

5. The method according to claim 1, wherein a zone is reservable for a maximum of one transport system.

6. The method according to claim 1, further comprising the acts of:
    determining that the one or the plurality of zones are at least partially reserved for one other transport system based upon the occupancy status; and
    the one or the plurality of zones is only then reserved for the first transport system if the occupancy status of the one or the plurality of zones indicates that the one or the plurality of zones is no longer reserved for a transport system.

7. The method according to claim 1, further comprising acts of:
    sending out a response in relation to the reservation request, wherein
    the response shows if the one or the plurality of zones has been reserved for the first transport system or not.

8. A method for operating a first transport system in a logistics area, wherein different transport systems are operated in the logistics area, wherein each of the different transport systems has a different control system, wherein each of the different control systems is configured to guide a respective plurality of transport vehicles of the respective transport system through the logistics area, and wherein the logistics area is divided into a multitude of zones, the method comprising the acts of:
    determining, by a first control system of the first transport system, that a first transport vehicle of the first transport system is to be driven into one or a plurality of zones of the logistics area on a route located ahead, wherein the first transport system is a manual transport system, the first transport system includes a plurality of first transport vehicles, the first transport vehicles of the first transport system are manually driven vehicles, and the first control system is configured to guide the first transport vehicles of the first transport system through the logistics area;
    sending, by the first control system of the first transport system to a control unit, a first reservation request for the one or the plurality of zones for the logistics area, wherein the control unit is superordinate to the different control systems;
    sending, by a second control system of a second transport system to the control unit, a second reservation request for the one or the plurality of zones for the logistics area, wherein the second transport system includes a plurality of second transport vehicles and the second control system is configured to guide the second transport vehicles of the transport system through the logistics area;
    receiving, by the first control system of the first transport system, a response from the control unit with regard to the reservation request depending on an occupancy status of the one or the plurality of zones and depending on a priority of the first transport system relative to the second transport system; and depending on the response, causing, by the first control system, the first transport vehicle to enter into the one or the plurality of zones, wherein the transport vehicles of the different transport systems have different degrees of automation.

9. The method according to claim 8, further comprising the acts of:

determining that the first transport vehicle has left or will leave the one or the plurality of zones; and sending a release message with regard to the one or the plurality of zones to the control unit.

\* \* \* \* \*